US011067824B2

(12) United States Patent
Nagano et al.

(10) Patent No.: US 11,067,824 B2
(45) Date of Patent: Jul. 20, 2021

(54) OPTICAL IMAGE STABILIZATION APPARATUS

(71) Applicant: CANON KABUSHIKI KAISHA, Tokyo (JP)

(72) Inventors: Toshimune Nagano, Saitama (JP); Kazuhiro Noguchi, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/730,045

(22) Filed: Dec. 30, 2019

(65) Prior Publication Data

US 2020/0225503 A1 Jul. 16, 2020

(30) Foreign Application Priority Data

Jan. 10, 2019 (JP) .............................. JP2019-002256

(51) Int. Cl.
*G02B 27/64* (2006.01)
*G03B 5/04* (2021.01)
*H04N 5/232* (2006.01)
*G03B 5/02* (2021.01)
*H04N 5/225* (2006.01)

(52) U.S. Cl.
CPC ............. *G02B 27/646* (2013.01); *G03B 5/02* (2013.01); *G03B 5/04* (2013.01); *H04N 5/2253* (2013.01); *H04N 5/23248* (2013.01); *G03B 2205/0015* (2013.01); *G03B 2205/0069* (2013.01)

(58) Field of Classification Search
CPC .. H04N 5/2253; H04N 5/2254; H04N 5/2257; H04N 5/2328–23287; G02B 27/64; G02B 27/646; G03B 5/00–02; G03B 2205/00–0084
See application file for complete search history.

(56) References Cited

U.S. PATENT DOCUMENTS 6,112,028 A 8/2000 Okada
7,619,838 B2 11/2009 Takahashi
(Continued)

FOREIGN PATENT DOCUMENTS

JP H10026782 A 1/1998
JP 3728094 B2 12/2005
JP 2007212876 A 8/2007
(Continued)

*Primary Examiner* — Paul M Berardesca
(74) *Attorney, Agent, or Firm* — Rossi, Kimms & McDowell LLP

(57) ABSTRACT

An optical image stabilization apparatus includes an image stabilization element, a base member, a shift member configured to hold the image stabilization element and movable in a direction including a component orthogonal to an optical axis relative to the base member, an elastic member configured to support the image stabilization element and the shift member, and a driver configured to move the shift member. The driver includes a first magnet part and a second magnet part provided on one of the base member and the shift member, a coil provided on the other of the base member and the shift member, a first magnetized portion provided on a side of the first magnet part with respect to a center axis of an opening in the coil, and a second magnetized portion provided on a side of the second magnet part with respect to the center axis.

10 Claims, 9 Drawing Sheets

(56) References Cited

U.S. PATENT DOCUMENTS

| | | | | |
|---|---|---|---|---|
| 2007/0188620 A1* | 8/2007 | Takahashi | ................ | G03B 5/02 |
| | | | | 348/208.99 |
| 2011/0013029 A1* | 1/2011 | Akutsu | ................... | G03B 5/00 |
| | | | | 348/208.11 |

FOREIGN PATENT DOCUMENTS

| JP | 2010039083 | * | 2/2010 |
|---|---|---|---|
| JP | 2010039083 A | | 2/2010 |
| JP | 4448157 B2 | | 4/2010 |

* cited by examiner

OPTICAL IMAGE STABILIZATION APPARATUS

BACKGROUND OF THE INVENTION

Field of the Invention

The present invention relates to an optical image stabilization apparatus that restrains an image blur, and is suitable, for example, for a lens apparatus and an imaging apparatus.

Description of the Related Art

An optical image stabilization apparatus that suppresses an image blur caused by a camera shake or the like has been conventionally known.

Japanese Patent No. 3728094 discloses a lens barrel that acquires an image stabilization effect without increasing the size of an electromagnetic actuator by installing a ferromagnetic body above the center of the coil to apply a magnetic force so as to support its own weight and to reduce a required force.

Japanese Patent No. 4448157 discloses a lens barrel that includes a magnetic circuit formed with a yoke attached to a shift frame and a magnet member attached to a base member, and generates a holding force in a state where the lens center position coincides with the optical axis. The lens barrel disclosed in Japanese Patent No. 4448157 forms a convex shape from the yoke to the inner diameter portion of the coil, and always generates a force to the outside during driving or an adsorptive force in a direction of weakening the holding force.

Japanese Patent Laid-Open No. 2010-39083 discloses an optical image stabilization apparatus that mechanically holds a shift frame with an elastic member.

However, the lens barrel disclosed in Japanese Patent No. 3728094 generates a magnetic force in a disadvantageous direction depending on a camera tilting direction, for example, during imaging with the vertically oriented camera. It is thus difficult to reduce the size of the lens barrel because the force required for the optical image stabilization apparatus cannot be reduce during imaging with the vertically oriented camera.

The lens barrel disclosed in Japanese Patent No. 4448157 requires the yoke to be attached to the shift frame, when the coil is attached to the shift frame. As a result, the electromagnetic actuator becomes larger and it is difficult to reduce the size of the lens barrel.

The optical image stabilization apparatus disclosed in Japanese Patent Laid-Open No. 2010-39083 generates the force towards the center direction using the elastic member, and therefore increases the force towards the center direction in approximate proportion to the distance. Hence, the required thrust becomes larger as the image stabilization element moves away from the center. As a consequence, it is necessary to increase the size of the electromagnetic actuator and it is difficult to reduce the size of the optical image stabilization apparatus.

SUMMARY OF THE INVENTION

The present invention provides an optical image stabilization apparatus smaller than ever.

An optical image stabilization apparatus according to one aspect of the present invention includes an image stabilization element, a base member, a shift member configured to hold the image stabilization element and movable in a direction including a component orthogonal to an optical axis relative to the base member, an elastic member configured to support the image stabilization element and the shift member, and a driver configured to move the shift member. The driver includes a first magnet part and a second magnet part provided on one of the base member and the shift member, a coil provided on the other of the base member and the shift member, a first magnetized portion provided on a side of the first magnet part with respect to a center axis of an opening in the coil, and a second magnetized portion provided on a side of the second magnet part with respect to the center axis.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
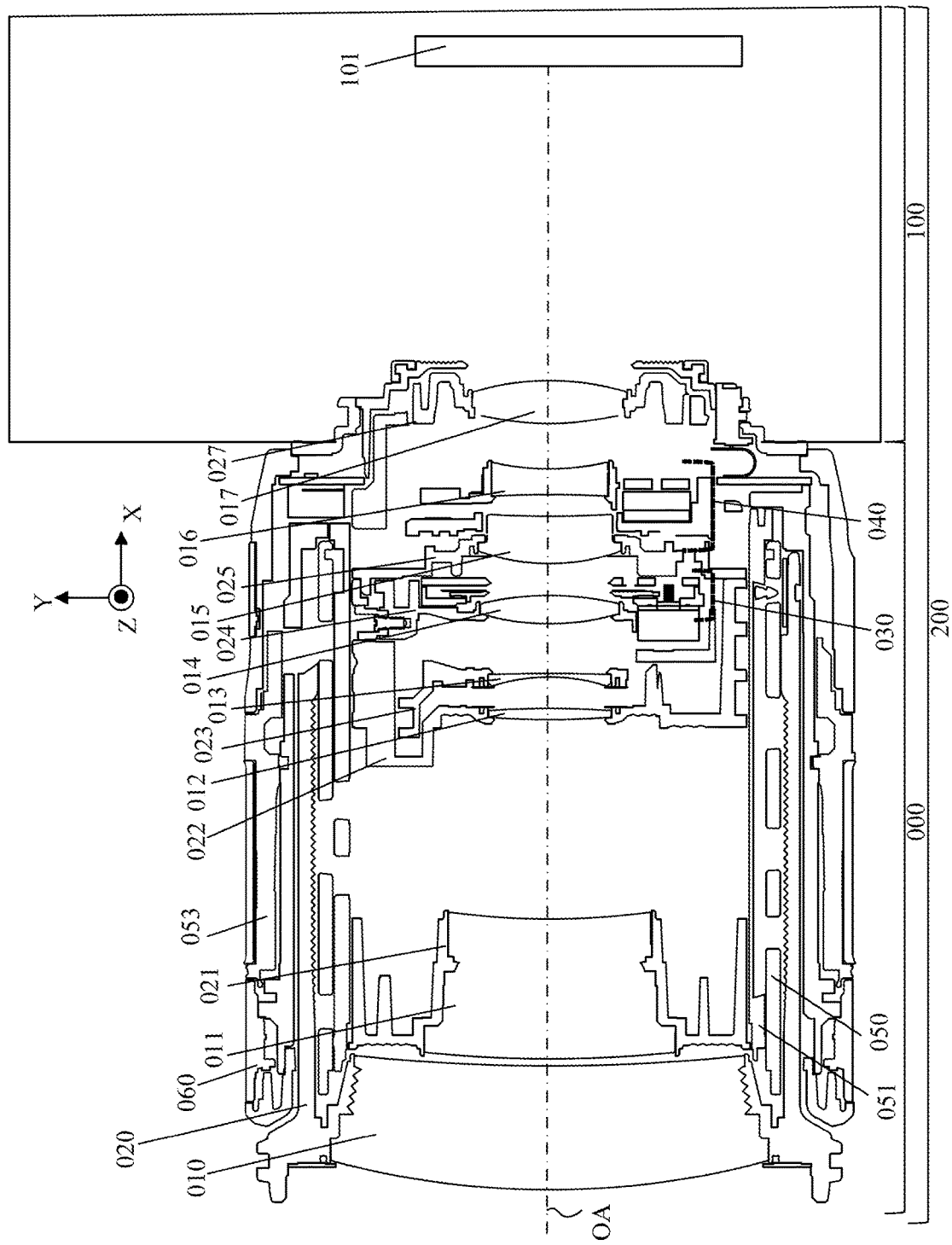
FIG. 1 is a schematic diagram of a camera system according to each embodiment.

Referring now to FIG. 1, a description will be given of a camera system (optical apparatus) 200 according to a first embodiment of the present invention. FIG. 1 is a schematic diagram of a camera system 200.

The camera system 200 includes a lens barrel (lens apparatus) 000 and a camera body (imaging apparatus body) 100. In this embodiment, the camera system 200 is an interchangeable lens type camera system in which the lens barrel 000 is attachable to and detachable from the camera body 100, but is not limited to this embodiment. The present invention is also applicable to a camera system in which a lens barrel and a camera body are integrated with each other.

The lens barrel 000 has one or more lenses. In this embodiment, the lens barrel 000 includes, an imaging optical system, a first lens unit 010, a second lens unit 011, a 3A-th lens unit 012, a fourth lens unit 013, a 3B-th lens unit 014, a fifth lens unit 015, and a sixth lens unit 016, and a seventh lens unit 017. The camera body 100 includes an image sensor 101 that photoelectrically converts an optical image (object image) formed through the imaging optical system in the lens barrel 000. In this embodiment, a light traveling direction (direction along the optical axis OA) is set to an X-axis direction, a vertical direction in a normal orientation imaging state is set to a Y-axis direction, and a vertical direction in a vertical orientation imaging state is set as a Z-axis direction.

The first lens unit 010 is held by a first barrel 020. The second lens unit 011 is held by a second barrel 021. The 3A-th lens 012 is held by a 3A-th barrel 022. The fourth lens unit 013 is a focus lens for focusing, and held by a fourth barrel 023. The 3B-th lens unit 014 is held by a 3B—the barrel 024. The fifth lens unit 015 is held by a fifth barrel 025. The fifth barrel 025 is connected to a guide barrel 051 and a cam barrel 050. The sixth lens unit 016 is an image stabilization lens serving as an image stabilization element, and movably held by an image stabilization unit 40 in a direction (direction intersecting the optical axis direction, more specifically, direction orthogonal to the optical axis direction) different from the light traveling direction (optical axis direction). The seventh lens unit 017 is held by a seventh barrel 027.

A guide barrel 051 and a cam barrel 050 form a zoom mechanisms that drives each lens in the lens barrel 000 in the optical axis direction for zooming. Although its details will be omitted because they are known structures, each lens can be driven in the X-axis direction by rotating the cam barrel 050 relative to a rectilinear barrel in conjunction with a zoom operation ring 053. Since the focusing mechanism is a known structure, its details will be omitted. A driving amount of the fourth lens unit 013 is calculated based on the operation amount of a focus operation ring 060 obtained by an operation amount detection mechanism using the photo-interrupter, and the fourth lens unit 013 is driven by an unillustrated stepping motor.

The image stabilization unit 040 is fixed onto the 3B-th barrel (barrel member) 024 and connected by the cam barrel 050 and the guide barrel 051 so as to move forward and backward. The image stabilization unit 040 has an unillustrated flexible substrate for supplying power to the drive mechanism and for transmitting a control signal from a main circuit board 080 fixed onto a fixed barrel 070. The flexible substrate has a U-turn portion, and the image stabilization unit 040 is movable back and forth in the X-axis direction relative to the guide tube 051 as the U-turn portion moves.

The main circuit board 080 controls driving of the sixth lens unit 016 in the image stabilization unit 040 in a direction different from the X axis based on a signal detected by a gyro sensor (angular velocity detector) configured to detect an unillustrated angular velocity (vibration) attached to the fixed barrel 070. Thereby, image blur in the image sensor 101 can be reduced (image stabilization control). The details of the image stabilization control will be omitted because they are known techniques. Although the light amount adjustment mechanism is a known technique and a description thereof will be omitted, the diaphragm unit 030 is fixed onto the 3B-th barrel 024 and connected to the guide barrel 051 and the cam barrel 050.

Figure 2:
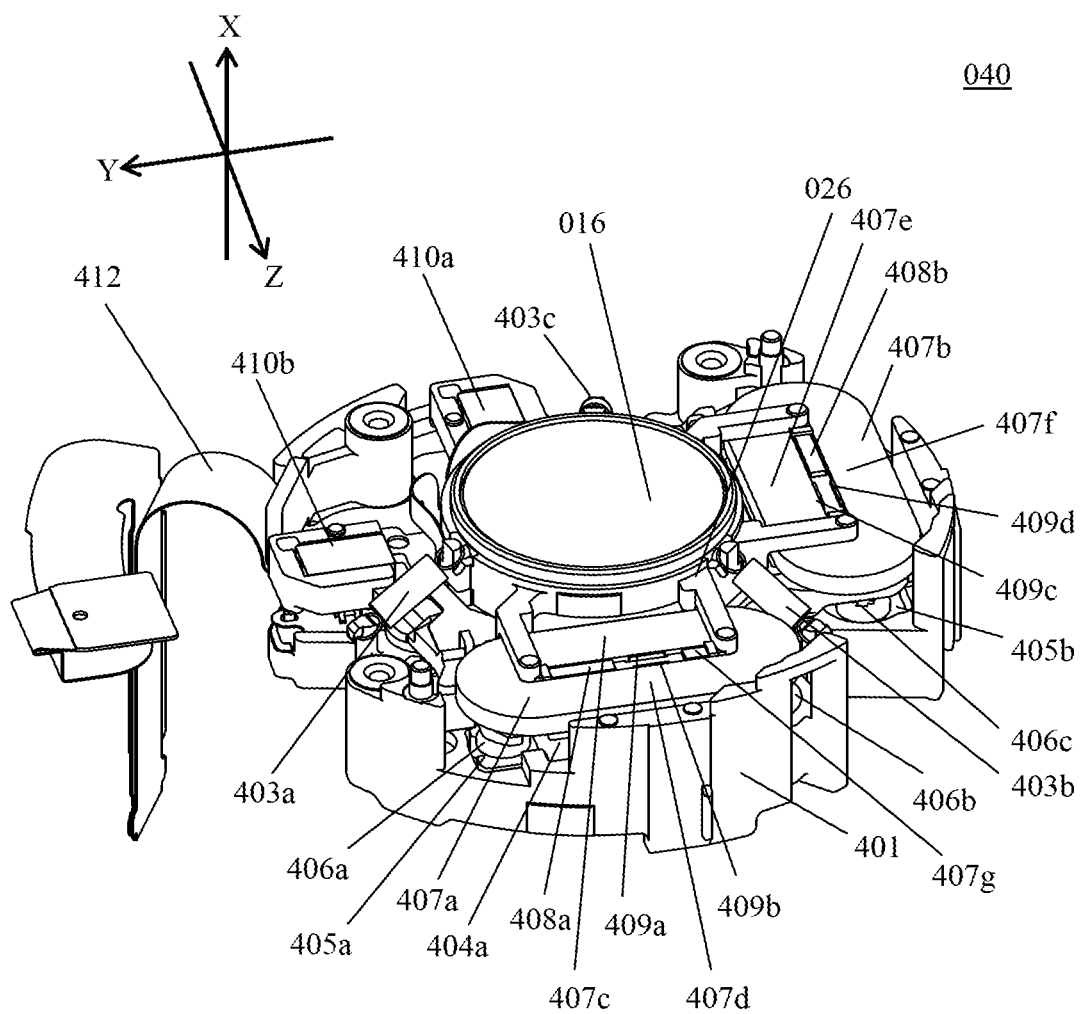
FIG. 2 is an overview of an image stabilization unit according to a first embodiment.
Figure 3:
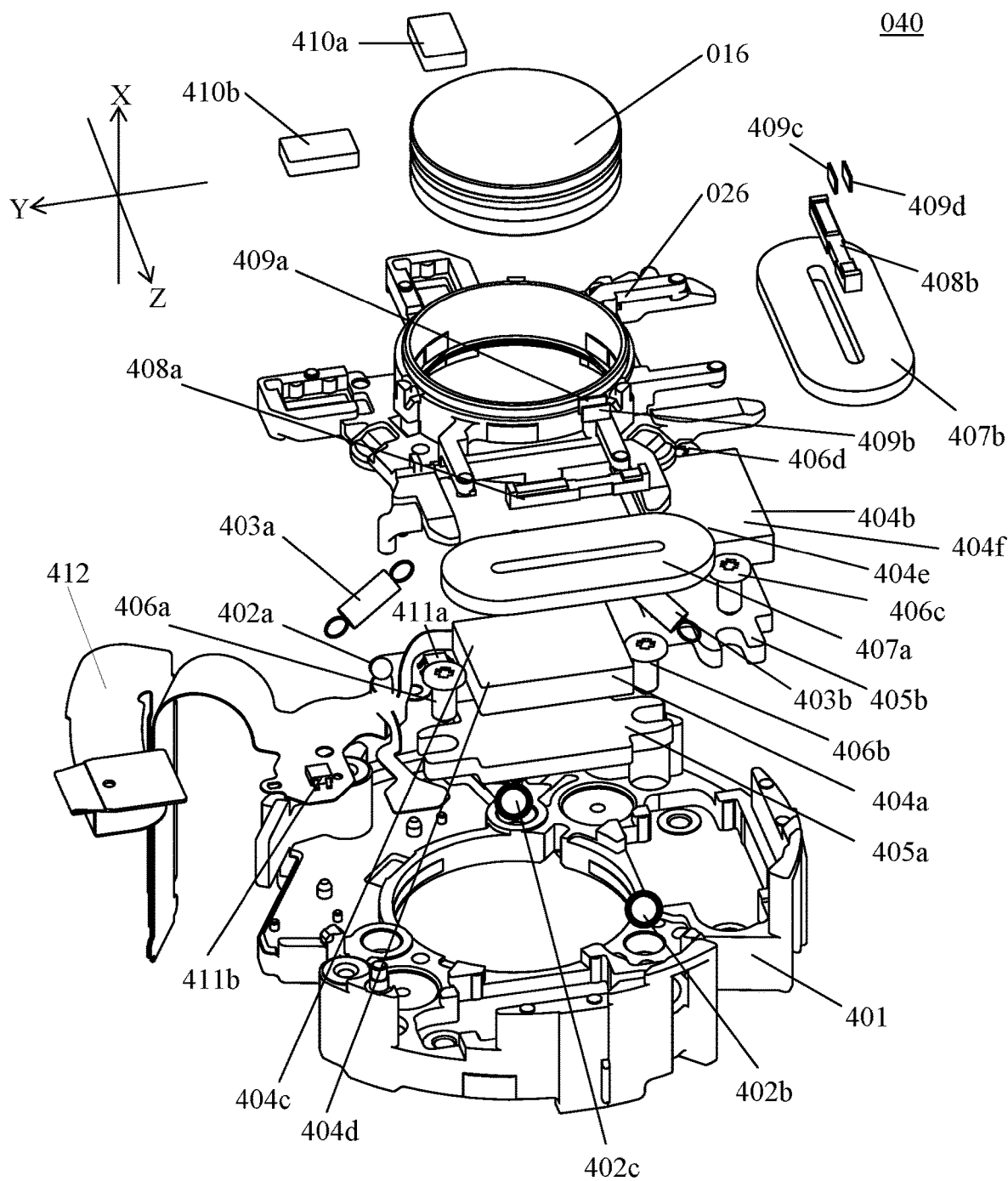
FIG. 3 is an exploded perspective view of the image stabilization unit according to the first embodiment.

Referring now to FIGS. 2 and 3, a detailed description will be given of the image stabilization unit 040. FIG. 2 is an overview of the image stabilization unit 040. FIG. 3 is an exploded perspective view of the image stabilization unit 040.

A shift barrel (shift member) 026 holds the sixth lens unit 016 and is movable relative to a base member 401 in a direction intersecting the optical axis OA. The shift barrel 026 is biased and supported in the X-axis direction relative to the base member 401 via balls 402a, 402b, and 402c so that it can be rolled by springs (elastic members) 403a, 403b, and 403c. At this time, the direction in which the shift barrel 026 is forced against the base member 401 is a minus (−) direction on the X axis. The springs 403a, 403b, and 403c are bridged between the shift barrel 026 and the base member 401 so that the center of the sixth lens unit 016 substantially coincides with the optical axis OA of the lens barrel 000 in the normal orientation and the vertical orientation of the camera system 200. Herein, "substantially coincide with the optical axis OA" covers not only a perfect coincidence but also a position that can be regarded as a substantial coincidence in terms of the optical performance. In other words, a resultant force on the YZ plane of the springs 403a, 403b, 403c at positions substantially coinciding with the optical axis OA in each orientation coincides with a force that supports the shift barrel 026 and a member fixed on the shift barrel 026 including the sixth lens unit 016. This embodiment sets the image stabilization element to the sixth lens unit 016, but is not limited to this example and the image sensor 101 can also be used as the image stabilization element.

Drive magnets 404a and 404b used to drive the shift barrel 026 are provided on a plus side of the X axis of the base member 401. Each of the drive magnets 404a and 404b is a two-pole magnetized magnet having N and S poles magnetized on a single surface. The drive magnet 404a is a magnet for driving in the Z-axis direction, and disposed on the + side of the Z-axis direction when viewed from the optical axis OA, and magnetic poles substantially parallel to the Y-axis direction are magnetized in the Z-axis direction. Then, an inner side near the optical axis OA is set to a first magnet part 404c, and an outer side far from the optical axis OA is set to a second magnet part 404d. The drive magnet 404b is a magnet for driving in the Y-axis direction, and is disposed on the minus side in the Y-axis direction when viewed from the optical axis OA, and magnetic poles substantially parallel to the Z-axis direction are magnetized in the Y-axis direction. Then, the inner side near the optical axis OA is set to a first magnet unit 404e, and the outer side far from the optical axis OA is set to a second magnet unit 404f.

The drive magnets 404a and 404b are respectively absorbed onto drive yokes 405a and 405b on the minus side of the X axis. The drive yokes 405a and 405b are fixed onto the base member 401 by screws 406a, 406b, 406c, and 406d, respectively. Then, the inner side (first magnet part 404c) on the + side of the X axis of the drive magnet 404a is fixed onto the S pole, and the outer side (second magnet part 404d) is fixed onto the N pole. In other words, the minus side of the X axis (drive yoke side) of the first magnet part 404c is the N pole, and the minus side of the X axis (drive yoke side) of the second magnet part 404d is the S pole. Similarly, the drive magnet 404b is also fixed so that the inner side (first magnet part 404e) on the plus side of the X axis is the S pole and the outer side (second magnet part 404f) is the N pole.

Drive coils 407a and 407b used to drive the shift barrel 026 are fixed onto the shift barrel 026. The drive coils 407a and 407b have conductive portions formed of substantially parallel lines along poles of the drive magnets 404a and 404b, respectively. Then, a first conductive portion 407c in the drive coil 407a is located at a position facing the S pole of the drive magnet 404a at a position where the sixth lens unit 016 coincides with the optical axis OA. A second conductive portion 407d in the drive coil 407a is located at a position facing the N pole of the drive magnet 404a at a position where the sixth lens unit 016 coincides with the optical axis OA. A first conductive portion 407e in the drive coil 407b is located at a position facing the S pole of the drive magnet 404b at a position where the sixth lens unit 016 coincides with the optical axis OA. A second conductive portion 407f in the drive coil 407b is located at a position facing the N pole of the drive magnet 404b at a position where the center of the sixth lens unit 016 coincides with the optical axis OA. The first conductive portion 407c and the second conductive portion 407d are connected to each other at their ends, and are connected by a flexible substrate 412 so as to supply the current. Similarly, the first conductive portion 407e and the second conductive portion 407f are also coupled at their ends and are connected by the flexible substrate 412 so as to supply the current.

A space 407g (opening of the drive coil 407a) is formed by the end of the first conductive portion 407c and the end of the second conductive portion 407d that are connected to each other. Arranged in the space 407g are a first magnetic body (first magnetized portion) 409a, a second magnetic body (second magnetized portion) 409b, and a magnetic body holding member 408a as a driving amount amplifier in the Z-axis direction. The first magnetic body 409a is a ferromagnetic body having a surface substantially parallel to the XY plane, and disposed on the S pole side of the drive magnet 404a in the space 407g. The second magnetic body 409b is a ferromagnetic body having a surface substantially parallel to the XY plane, and disposed on the N pole side of the drive magnet 404a in the space 407g. A first magnetic body (first magnetized portion) 409c, a second magnetic body (second magnetized portion) 409d and a magnetic body holding member 408b as a driving amount amplifier in the Y-axis direction are similarly composed in the drive coil 407b. In this embodiment, the first magnetic body 409a, the second magnetic body 409b, the first magnetic body 409c, and the second magnetic body 409d are not iron cores but plate-shaped ferromagnetic bodies.

Hall sensors 411a and 411b configured to detect a magnetism used to detect the position of the shift barrel 026 are fixed on the + side of the X axis of the base member 401, and connected to the flexible substrate 412 to detect signals. The shift barrel 026 is provided with position detecting magnets 410a and 410b approximately above the hall sensors 411a and 411b, respectively. Since such a position detecting method is known, a detailed description thereof will be omitted but a position can be detected based on a magnetic change caused by the position change.

At this time, the shift barrel 026, the sixth lens unit 016, the drive coils 407a and 407b, and the position detecting magnets 410a and 410b move together, and are collectively referred to as a movable unit. The center of gravity of the first magnetic body 409a and the second magnetic body 409b substantially coincides with the center of gravity of the movable unit in the Y-axis direction. The center of gravity of the first conductive portion 407e and the second conductive portion 407f substantially coincides with the center of gravity of the movable unit in the Z-axis direction. Thereby, it is possible to generate the force generated by each magnetic body without generating a force in the rotational direction of the movable unit. However, the present invention is not limited to this configuration.

Figure 4:
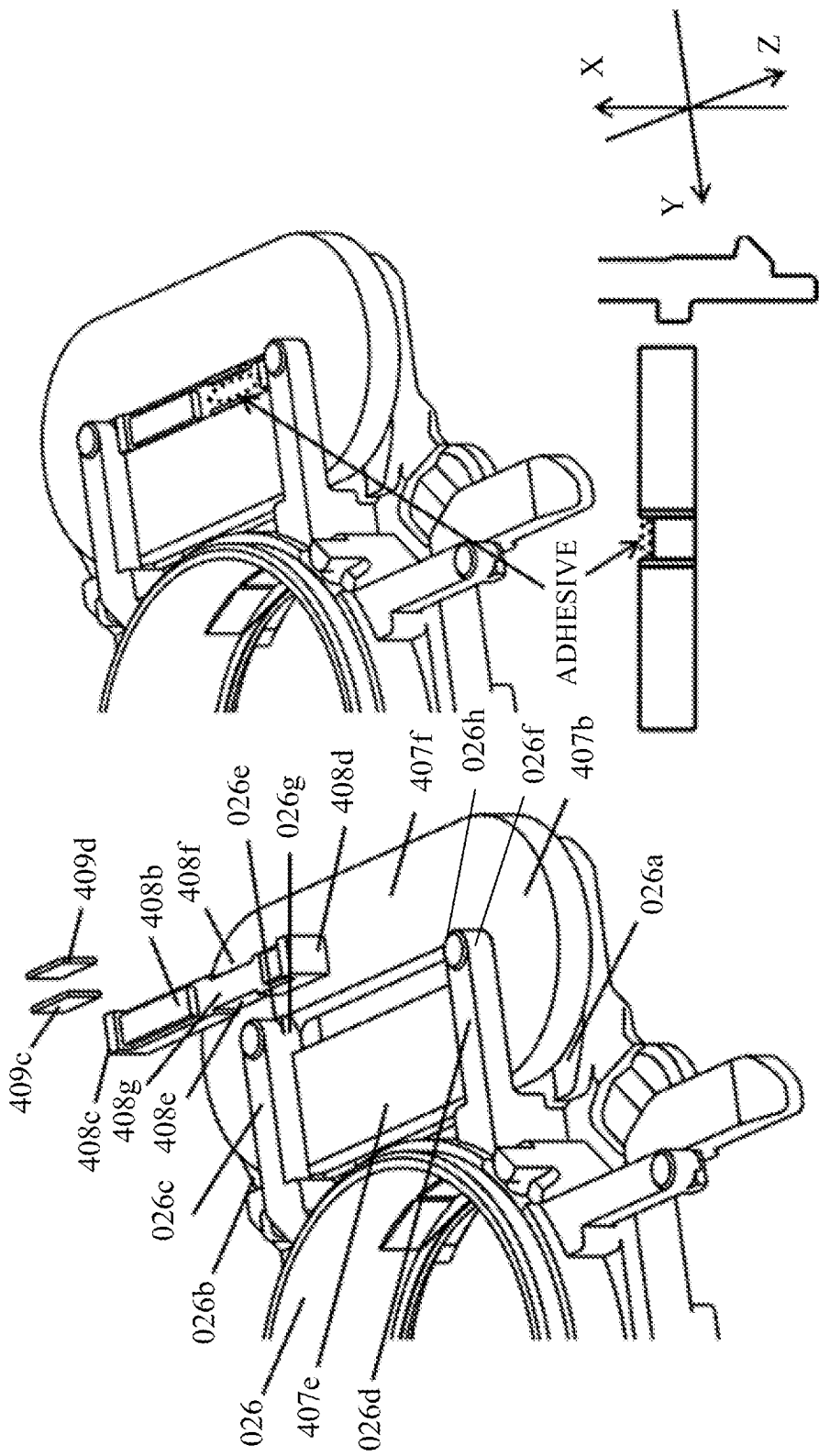
FIG. 4 is an overview for explaining a relationship between a drive coil and a driving amount amplifier according to the first embodiment.

Referring now to FIG. 4, a description will be given of a relationship between the drive coil 407b attached to the shift barrel 026 and the driving amount amplifier (the first magnetic body 409c and the second magnetic body 409d). FIG. 4 is an overview for explaining a relationship between the drive coil 407b and the driving amount amplifier.

The shift barrel 026 has coil receiving portions 026a and 026b and coil holding portions 026c and 026d. Coil insertion portions 026e and 026f are provided at the tips of the coil holding portions 026c and 026d so as to be inserted into the end of the drive coil 407b. An inclined portion is provided on the minus side of the axis of the coil insertion portions 026e and 026f so that the drive coil 407b can be inserted. This configuration enables the drive coil 407b to be positioned and fixed when it is inserted from the minus side of the Y axis. Also, holding portion contact surfaces 026g and 026h, which are contact surfaces with the magnetic body holding member 408a, are provided inside the coil insertion portions 026e and 026f, respectively.

The magnetic body holding member 408b has a contact surface 408c with the coil insertion portion 026e and a contact surface 408d with the coil insertion portion 026f. The magnetic body holding member 408b has magnetic body insertion portions 408e and 408f on opposite sides in the Y-axis direction. A recess 408g for injecting an adhesive into the magnetic body holding member 408b at a position overlapping the magnetic body insertion portions 408e and 408f in the Y-axis direction in a range longer than the magnetic body insertion portions 408e and 408f in the Z-axis direction.

In the state where the drive coil 407b is assembled into the shift barrel 026, the first magnetic body 409c and the second magnetic body 409d are inserted into the magnetic body insertion portions 408e and 408f while they are aligned with the drive coil 407b at the lower ends. In this state, the first magnetic body 409c, the second magnetic body 409d, and the magnetic body holding member 408a are fixed to the drive coil 407b by injecting the adhesive (UV curable adhesive) into the recess 408g and by curing the adhesive. However, the holding method of the first magnetic body 409c and the second magnetic body 409d is not limited to this method, and different methods may be adopted.

Figure 5:
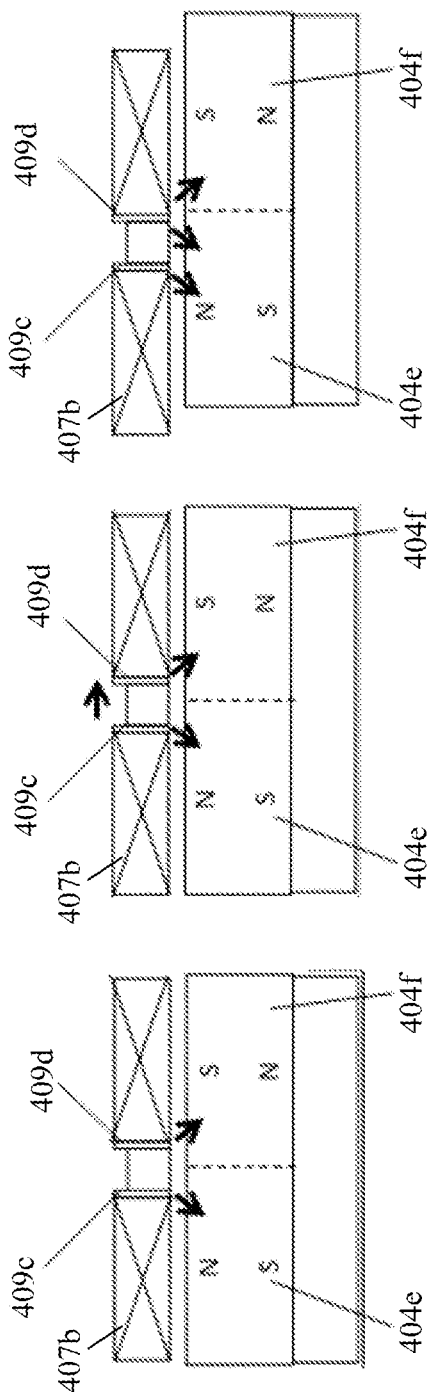
FIGS. 5A to 5C illustrate a relationship between the drive coil and the drive magnet according to the first embodiment.

Referring now to FIGS. 5A to 5C, a description will be given of a positional relationship between the drive coil 407b and the drive magnet 404b. FIGS. 5A to 5C illustrate a relationship between the drive coil 407b and the drive magnet 404b. FIG. 5A illustrates a state in which the center of the sixth lens unit 016 coincides with the optical axis OA, FIG. 5B illustrates a state in which the center of the sixth lens unit 016 substantially coincides with (or slightly shifts from) the optical axis OA, and FIG. 5C illustrates a state where the sixth lens unit 016 is located at the control end. FIGS. 5A to 5C correspond to the relationship among the drive coil 407b, the first magnetic body 409c, the second magnetic body 409d, and the drive magnet 404b in the normal posture. On the other hand, in the vertical position, FIGS. 5A to 5C correspond to the relationship among the drive coil 407b, the first magnetic body 409a, the second magnetic body 409b, and the drive magnet 404b. Herein, the positional relationship in FIGS. 5A to 5C will be described using the drive coil 407b, the first magnetic body 409c, the second magnetic body 409d, and the drive magnet 404b.

As illustrated in FIG. 5A, the first magnetic body 409c is closer to the first magnet part 404e than the second magnet part 404f at the position where the center of the sixth lens unit 016 coincides with the optical axis OA, and a force attracted to one magnet part 404e is applied. The second magnetic body 409d is closer to the second magnet part 404f than the first magnet part 404e, and a force attracted to the second magnet part 404f is applied. At this time, since the forces applied to the first magnetic body 409c and the second magnetic body 409d are located at approximately equal positions from both magnetic poles, they are approximately equal to each other and well-balanced. The magnetic flux emitted from the N pole of the drive magnet 404b passes through the second magnetic body 409d and the first magnetic body 409c in this order, enters the S pole of the drive magnet 404b, and is magnetically stable.

FIG. 5B illustrates that the first magnetic body 409c and the second magnetic body 409d are closer to the minus side of the Y-axis than FIG. 5A. As illustrated in FIG. 5B, the first magnetic body 409c is closer to the first magnet part 404e than the second magnet part 404f where the center of the sixth lens unit 016 substantially coincides with the optical axis OA, and the force attracted to the first magnet part 404e is applied. The second magnetic body 409d is closer to the second magnet part 404f than the first magnet part 404e, and the force attracted to the second magnet part 404f is applied. Even in this state, the forces applied to the first magnetic body 409c and the second magnetic body 409d are substantially equal to each other because they are located at substantially equal positions from both magnetic poles, but a slight force is applied to the minus side of the Y axis or to the outside.

The state of FIG. 5B shifts from the position of the pole magnetic circuit having the N pole of the first magnet part 404e, the second magnetic body 409d, the first magnetic body 409c, and the S pole of the second magnet part 404f that are most stable as in FIG. 5A. Hence, in the state of FIG. 5B, a force is applied which tries to return to the original position or towards the inside. By thus canceling out the attractive force by the closing force of the magnetic circuit, it is possible to form a state in which no force acts outside where the center of the sixth lens unit 016 substantially coincides with the optical axis OA. In other words, the magnetic circuit can be formed and the force acting to the inside can be generated in the inner diameter of the drive coil 407b by disposing the first magnetic body 409c on the S pole side of the drive magnet 404b, and the second magnetic body 409d on the N pole side of the first magnet part 404e.

In the control end state illustrated in FIG. 5C, the first magnetic body 409c is closer to the first magnet part 404e than the second magnet part 404f, and the force attracted to the first magnet part 404e is applied. The second magnetic body 409d is located at a substantially equivalent position from the second magnet part 404f and the first magnet part 404e, and the force attracted to the drive magnet 404b is substantially equal to the force attracted to the drive magnet 404a. At this time, since a ratio of the attractive force to the force for stabilizing the magnetic circuit is inversely proportional to the square of the distance, the outward force is larger. Even when the first magnetic body 409c and the second magnetic body 409d are closer to the + side of the Y-axis, the same magnetic circuit as that in this state is formed and thus this behavior is maintained. The first magnetic body 409a and the second magnetic body 409b are the same as the first magnetic body 409c and the second magnetic body 409d, respectively.

In this embodiment, each of the first magnetic body 409c and the second magnetic body 409d contacts the inner side surface of the drive coil 407b, but the present invention is not limited to this embodiment and the first magnetic body 409c and the second magnetic body 409d may be arranged apart from the drive coil 407b.

Figure 6:
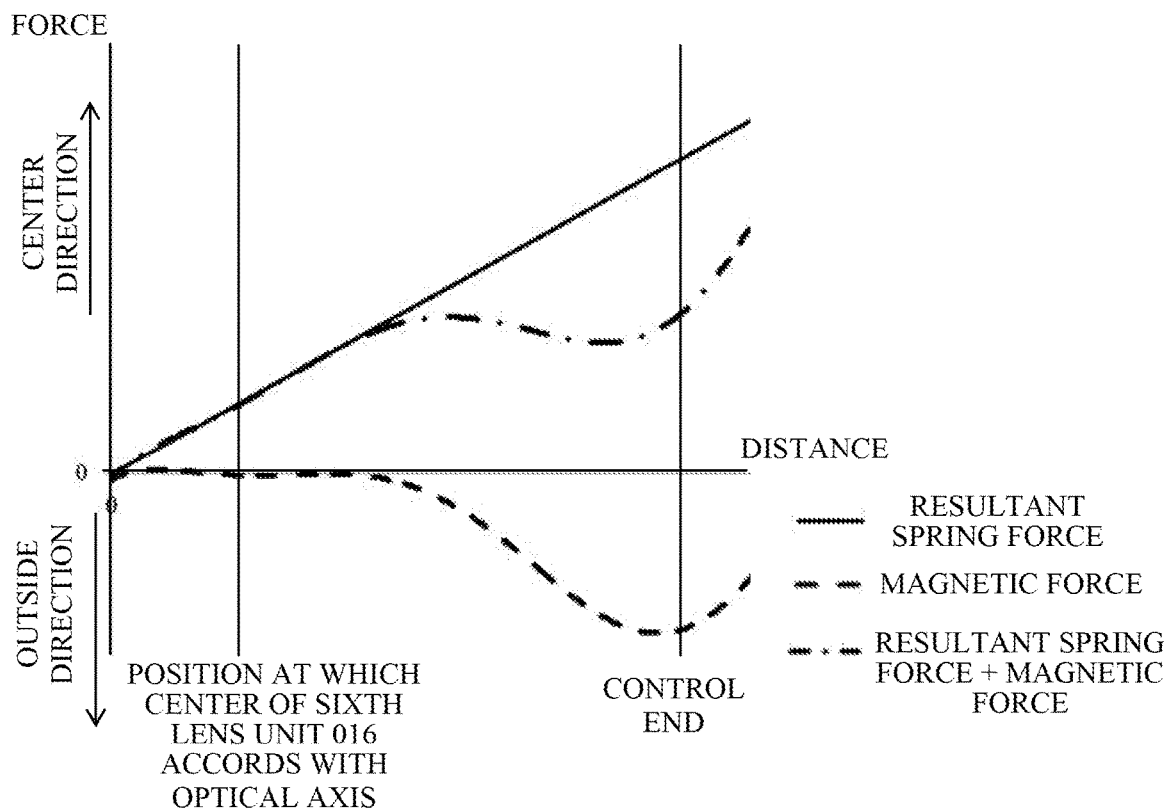
FIG. 6 is a graph showing a relationship between a resultant spring force acting on a movable unit and a magnetic force acting on the first magnetic body and the second magnetic body according to the first embodiment.

Referring now to FIG. 6, a description will be given of a relationship between the resultant force (resultant spring force) of the springs 403a, 403b, and 403c acting on the movable unit and the magnetic force acting on the first magnetic body 409c and the second magnetic body 409d. FIG. 6 is a graph showing the relationship between the resultant force (resultant spring force) of the springs 403a, 403b, and 403c acting on the movable unit and the magnetic force acting on the first magnetic body 409c and the second magnetic body 409d. In FIG. 6, the ordinate axis denotes the force toward the center direction, and the abscissa axis denotes the distance from the center. The position of the distance 0 is a position where the center of the sixth lens unit 016 coincides with the optical axis OA. FIG. 6 illustrates a position where the center of the sixth lens unit 016 and the optical axis OA substantially coincide with each other (not a completely coincident position but a slightly shifted position).

In FIG. 6, a solid line represents the resultant force (resultant spring force) in the center direction of the springs 403a, 403b, and 403c, and increases approximately in proportion to the distance. In other words, this solid line coincides with the force acting on the movable unit in the prior art. A broken line represents a magnetic force (a resultant magnetic force) acting on the first magnetic body 409c and the second magnetic body 409d, and the magnetic force is zero due to the above phenomenon is in a range (position) where the center of the sixth lens unit 016 substantially coincides with the optical axis OA. However, as described above, the attractive force becomes larger as the position is closer to the control end, and thus the force is applied to the outside. An alternate long and short dash line represents a sum of the resultant spring force (solid line) and the magnetic force (broken line), and is the force acting on the movable unit in this embodiment.

At this time, the settled position of the sixth lens unit 016 in the power-off state is determined by the weight of the movable unit, the resultant spring force, and the resultant magnetic force. However, in the range where the center of the sixth lens unit 016 and the optical axis OA substantially coincide with each other, only the resultant spring force is applied. Therefore, the settled position of the sixth lens unit 016 is determined by the resultant spring force. In other words, the sixth lens unit 016 is held at a position where the resultant spring force at the position dropped from the center and the weight of the movable unit coincide with each other in each orientation. In other words, it is held at the same position as the prior art.

On the other hand, the power consumption for moving outward near the control end of the power supply ON is determined by the force that moves the weight of the movable unit, the resultant spring force, and the magnetic force. In other words, in the prior art, a force is required to support the proportionally increased amount of the resultant spring force at the control end. On the other hand, in this embodiment, the force in the center direction generated in the movable unit is reduced by the amount of the resultant magnetic force, so that the power consumption for moving outside near the control end of the power supply ON is smaller than that of the prior art. As a result, the first magnetic body 409a, the second magnetic body 409b, the first magnetic body 409c, and the second magnetic body 409d can secure a driving amount necessary to satisfy the image stabilization performance without increasing the sizes of the drive magnet, the drive coil, and the drive yoke as a driver. The configuration according to this embodiment enables the ferromagnetic bodies (first magnetic body 409a, second magnetic body 409b, first magnetic body 409c, and second magnetic body 409d) to be arranged on the inner diameters of the drive coils 407a and 407b. Hence, a small ferromagnetic body near the drive magnet can generate a large magnetic force. In other words, it is possible to realize an optical image stabilization apparatus without increasing the weight of the movable unit. As a result, this embodiment can provide the optical image stabilization apparatus that can hold a compact image stabilization element with a low power consumption.

While this embodiment illustrates the resultant force of the magnetic force of 0, but the present invention is also applicable even when the force in the central direction is increased. In this case, in comparison with a case where the resultant the magnetic force is 0, the center of the sixth lens unit 016 coincides with a position closer to the optical axis OA, and thus substantially coincides in terms of the optical performance. Since the control of the optical image stabilization apparatus in the power-on state is a known control method, a detailed description thereof will be omitted, but the image stabilization element is controlled to an arbitrary position by the driving based on the position detection signal acquired from the position detection sensor.

Second Embodiment

Next follows a description of a second embodiment according to the present invention. This embodiment is different from the first embodiment in that an image stabilization unit 042 is provided instead of the image stabilization unit 040.

Figure 7:
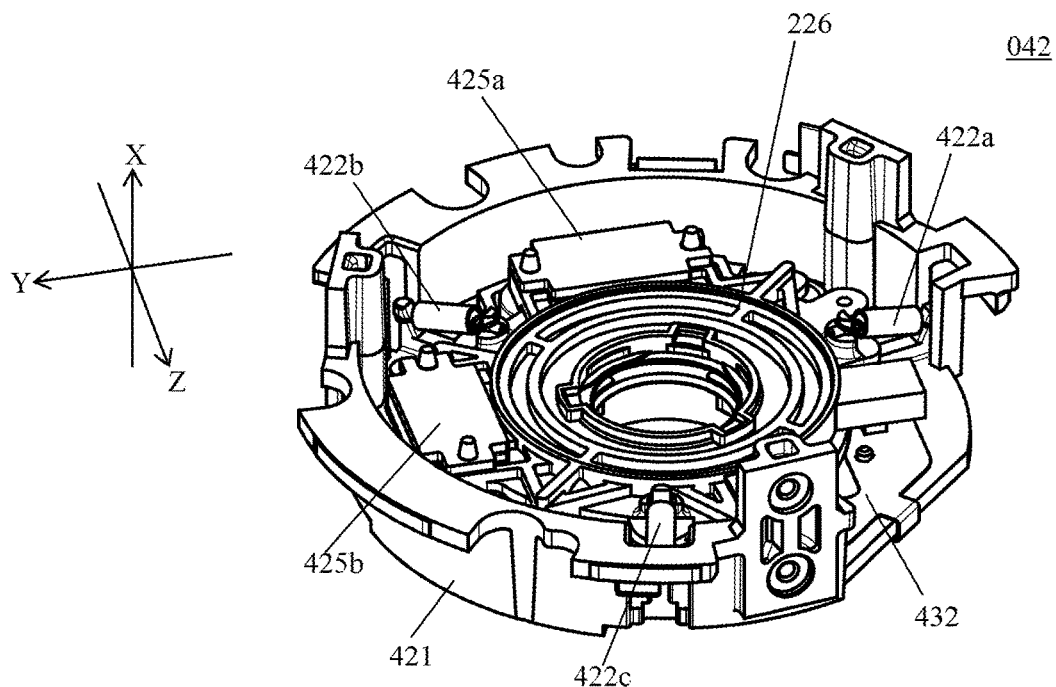
FIG. 7 is an overview of an image stabilization unit according to a second embodiment.
Figure 8:
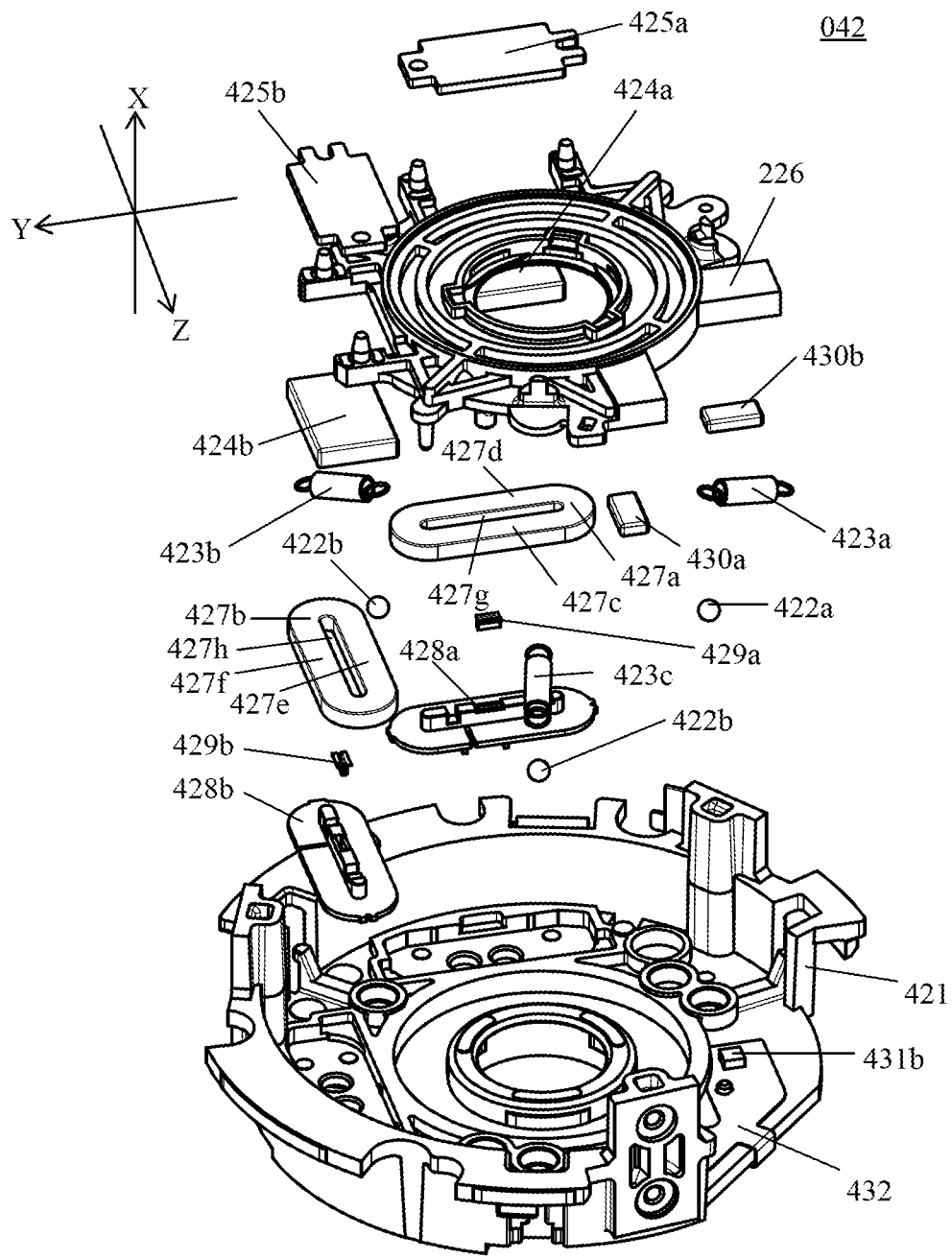
FIG. 8 is an exploded perspective view of the image stabilization unit according to the second embodiment.

Referring now to FIGS. 7 and 8, a description will be given of a configuration of the image stabilization unit 042. FIG. 7 is an overview of the image stabilization unit 042. FIG. 8 is an exploded perspective view of the image stabilization unit 042.

A shift barrel (shift member) 226 holds a sixth lens unit (image stabilization element) 016 and is movable in a direction intersecting the optical axis OA for the base member 421. The shift barrel 226 is biased and supported in the X-axis direction for the base member 421 via balls 422*a*, 422*b*, and 422*c* so that the shift barrel 226 can be rolled by springs (elastic members) 423*a*, 423*b*, and 423*c*. At this time, the direction in which the shift barrel 226 is biased against the base member 401 is the minus (−) direction of the X axis. The springs 423*a*, 423*b*, and 423*c* are bridged between the shift barrel 226 and the base member 421 so that the center of the sixth lens unit 016 substantially coincides with the optical axis OA of the lens barrel 000 in the normal orientation and the vertical orientation of the camera system 200. Herein, "substantially coincide with the optical axis OA" means not only a perfect coincidence but also a position that can be regarded as a substantial coincidence in terms of the optical performance. In other words, a member in which the resultant force on the YZ plane of the springs 423*a*, 423*b*, and 423*c* at positions substantially coincident with the optical axis OA in each posture is equal to the force that supports the member fixed onto the shift barrel 026 including the shift barrel 226 and the sixth lens unit 016.

Drive magnets 424*a* and 424*b* used to drive the shift barrel 226 are provided on the minus (−) side of the X axis of the base member 421. Each of the drive magnets 424*a* and 424*b* is a two-pole magnetized magnet in which an N pole and an S pole are magnetized on a single surface. The drive magnet 424*a* is a magnet for driving in the Z-axis direction, and disposed on the − side of the Z-axis direction when viewed from the optical axis OA, and magnetic poles substantially parallel to the Y-axis direction are magnetized in the Z-axis direction. The drive magnet 424*b* is a magnet for driving in the Y-axis direction, and disposed on the + side of the Y-axis direction when viewed from the optical axis OA, and magnetic poles substantially parallel to the Z-axis direction are magnetized in the Y-axis direction.

The drive magnets 424*a* and 424*b* are attracted to drive yokes 425*a* and 425*b* on the + side of the X axis, respectively. The drive yokes 425*a* and 425*b* are fixed onto the shift barrel 226 with an adhesive integrally with the drive magnets 424*a* and 424*b*, respectively. The inside of the − side of the X axis of the drive magnet 424*a* is set to the S pole and the outside is set to the N pole. In other words, the + side of the X-axis (drive yoke side) of the drive magnet 424*a* is set to the N pole, and the outside is set to the S pole. Similarly, the drive magnet 424*b* is fixed so that the inner side on the + side of the X axis is set to the S pole and the outer side is set to the N pole.

Drive coils 427*a* and 427*b* used to drive the shift barrel 226 are fixed onto the base member 421 integrally with bobbins 428*a* and 428*b*, respectively. Each of the drive coils 427*a* and 427*b* has a conductive portion formed of a substantially parallel line along each pole of the drive magnets 424*a* and 424*b*. The first conductive portion 427*c* in the drive coil 427*a* is located at a position facing the S pole of the drive magnet 424*a* at a position where the center of the sixth lens unit 016 coincides with the optical axis OA. The second conductive portion 427*d* in the drive coil 427*a* is located at a position facing the N pole of the drive magnet 424*a* at a position where the center of the sixth lens unit 016 coincides with the optical axis OA. The first conductive portion 427*e* in the drive coil 427*b* is located at a position facing the S pole of the drive magnet 424*b* at a position where the center of the sixth lens unit 016 coincides with the optical axis OA. The second conductive portion 427*f* in the drive coil 427*b* is located at a position facing the N pole of the drive magnet 424*b* at a position where the center of the sixth lens unit 016 coincides with the optical axis OA. The first conductive portion 427*c* and the second conductive portion 427*d* are connected at their ends and are connected to a flexible substrate 432 so as to receive the current. Similarly, the first conductive portion 427*e* and the second conductive portion 427*f* are connected at their ends and connected to the flexible substrate 432 so as to receive the current.

A first magnetic body 429*a* serving as a driving amount amplifier in the Z-axis direction is disposed in a space 427*g* formed by the end of the first conductive portion 427*c* and the end of the second conductive portion 427*d*. A second magnetic body 429*b* serving as a driving amount amplifier in the Z-axis direction is disposed in a space 427*h* formed by the end of the first conductive portion 427*e* and the end of the second conductive portion 427*f*. Each of the first magnetic body 429*a* and the second magnetic body 429*b* is a ferromagnetic body having two surfaces substantially parallel to the XY plane, and disposed in the spaces 427*g* and 427*h*. Details of this will be described later.

Hall sensors 431*a* and 431*b* configured to detect a magnetism used to detect the position of the shift barrel 226 are fixed on the + side of the X axis of the base member 421, and connected to the flexible substrate 432 to detect signals. The shift barrel 226 is provided with position detection magnets 430*a* and 430*b* approximately above the hall sensors 431*a* and 431*b*, respectively. Since such a position detection method is known, a detailed description thereof will be omitted but a position can be detected based on a magnetic change due to a position change.

At this time, the shift barrel 226, the sixth lens unit 016, the drive magnets 424*a* and 424*b*, and the position detection magnets 430*a* and 430*b* move together, and they are collectively referred to as a movable unit. The center of gravity of the first magnetic body 429a approximately coincides with the center of gravity of the movable unit in the Y-axis direction. The center of gravity of the second magnetic body 429b approximately coincides with the center of gravity of the movable unit in the Z-axis direction. Thereby, it is possible to generate the force generated by each magnetic body without generating a force in the rotational direction of the movable unit. However, the present invention is not limited to this configuration.

Figure 9:
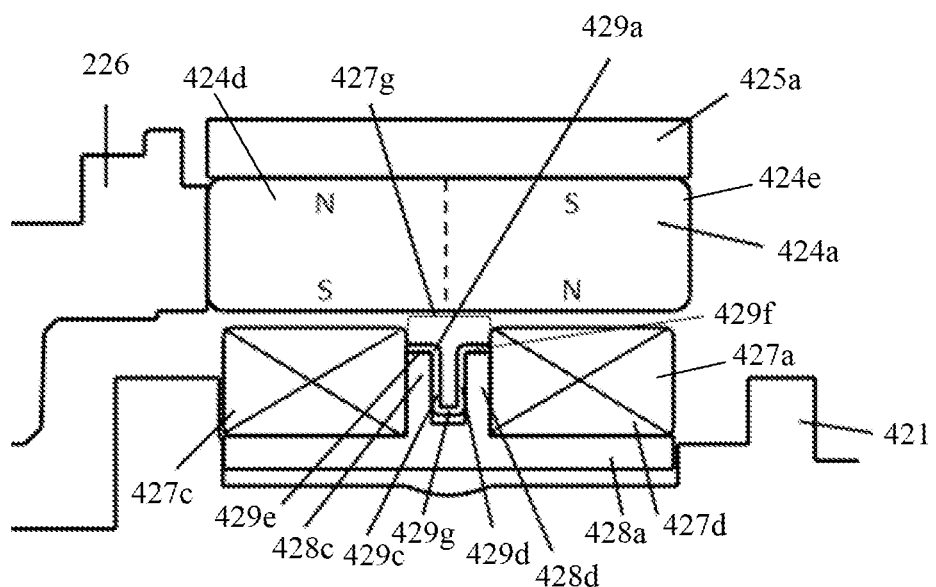
FIG. 9 is a sectional view of a driver according to the second embodiment.

Referring now to FIG. 9, a description will be given of a structure of the driver (drive magnet 424a, drive yoke 425a, drive coil 427a, and first magnetic body 429a) according to this embodiment. FIG. 9 is a sectional view of the driver. FIG. 9 illustrates the driver on the drive side in the Z-axis direction, but the driver on the driving side in the Y-axis (driving magnet 424b, driving yoke 425b, drive coil 427b, and second magnetic body 429b) has a similar structure.

The bobbin 428a has a convex portion 428c on the first conductive portion 427c side and a convex portion 428d on the second conductive portion 427d side in the space 427g having the inner diameter of the drive coil 427a. A space 428e is formed between the convex portions 428c and 428d. The first magnetic body 429a includes a magnetic force generator 429c that generates a magnetic force for the first magnet part 424d on the inner diameter side of the drive magnet 424a. The magnetic force generator 429c has a plane extending in the optical axis direction parallel to the first conductive portion 427c or the second conductive portion 427d. The first magnetic body 429a has a magnetic force generator 429d that generates a magnetic force for the second magnet part 424e on the outer side of the drive magnet 424a. The magnetic force generator 429d has a plane extending in the optical axis direction parallel to the first conductive portion 427c or the second conductive portion 427d.

The magnetic force generators 429c and 429d (first magnetized portion and second magnetized portion) contact the convex portions 428c and 428d, respectively. The first magnetic body 429a has a connector 429g that connects the magnetic force generator (first magnetized portion) 429c and the magnetic force generator (second magnetized portion) 429d with each other on the opposite side of the drive magnet 424a. In other words, the shortest distance between the connector 429g and the first magnet part 424d or the second magnet part 424e is longer than the shortest distance in the optical axis direction between the magnetic force generator 429c or 429d and the first magnet part 424d or the second magnet part 424e. A magnetic circuit including the first magnet part 424d, the magnetic force generators 429c and 429d, and the second magnet part 424e can be made more stable where the optical axis OA and the center of the sixth lens unit 016 substantially coincide with each other by the connector 429g. As a result, the force acting inside can be made larger at the position where the optical axis OA and the center of the sixth lens unit 016 substantially coincide with each other. In other words, a relationship between the driving distance when the first magnetic body 429a is driven and the inward force and the outward force that occur in the first magnetic body 429a and the first magnet part 424d and the second magnet part 424e can be adjusted by changing the area of the connector 429g.

The first magnetic body 429a has a planar portion (first extending portion) 429e extending on the driving surface of the shift barrel 226 toward the first magnet part 424d on the driving magnet 424a side of the magnetic force generator 429c. The first magnetic body 429a has a planar portion (second extending portion) 429f extending on the driving surface of the shift barrel 226 toward the second magnet part 424e on the driving magnet 424a side of the second magnet part 424e. The planar portions 429e and 429f can more stably receive the magnetic lines of force of the first magnet part 424d and the second magnet part 424e. As a result, even when the distance between the drive magnet 424a and the first magnetic body 429a varies in the optical axis direction, the influence of magnetism can be more stably obtained. In other words, the relationship can be made stable among the driving distance in driving the first magnetic body 429a, the inward force and the outward force generated by the first magnetic body 429a, the first magnet part 424d, and the second magnet part 424e.

As illustrated in FIG. 9, the planar portions 429e and 429f are arranged on the convex portions 428c and 428d, respectively. The adhesive is injected into a portion corresponding to the space 427g of the drive coil 427a above the planar portions 429e and 429f, and the bobbin 428a, the first magnetic body 429a, and the drive coil 427a are fixed.

According to this embodiment, a force is inwardly applied so that the center of the sixth lens unit 016 is directed to the optical axis OA at a position where the optical axis OA and the center of the sixth lens unit 016 substantially coincide (substantially coincide) with each other by inserting the ferromagnetic body into the drive coil. The outward force acts near the control end so that the center of the sixth lens unit 016 is separated from the optical axis OA. In other words, the force acts near the control end so as to cancel the inward force applied from the springs 423a, 423b, and 423c to the shift barrel 226, so that the driving load near the control end is reduced. As a result, the driving amount necessary can be secured for the image stabilization without increasing the size of the actuator having the drive magnet, the drive coil, and the drive yoke.

In this embodiment, the magnetic force generator (ferromagnetic body) has the planar portions (extending portions) on the first magnet part side and the second magnet part side. However, the absorption force is generated in each magnet part in the balanced state and they are separated or connected the extent that the magnetic circuit can be formed on the side away from the magnet in the inner diameter of the drive coil.

Third Embodiment

Figure 10A:
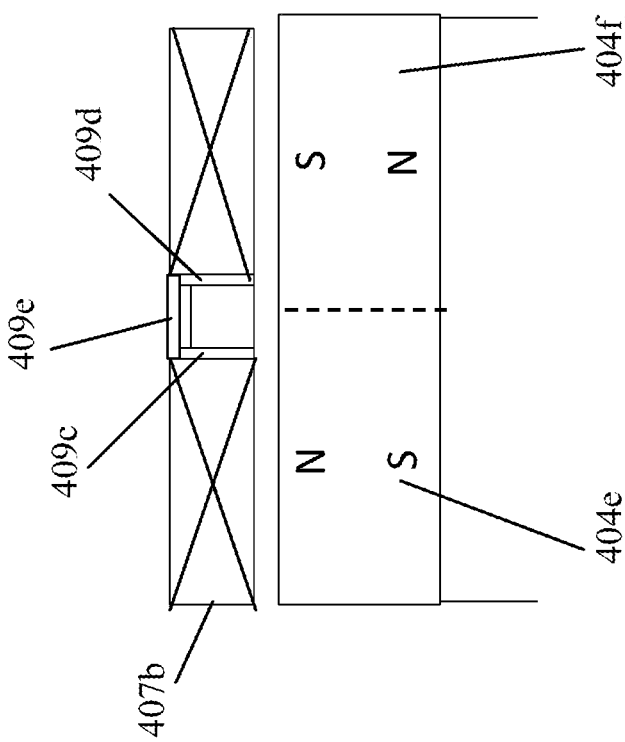
FIGS. 10A and 10B illustrate a configuration of a driving amount amplifier according to a third embodiment.
Figure 10B:
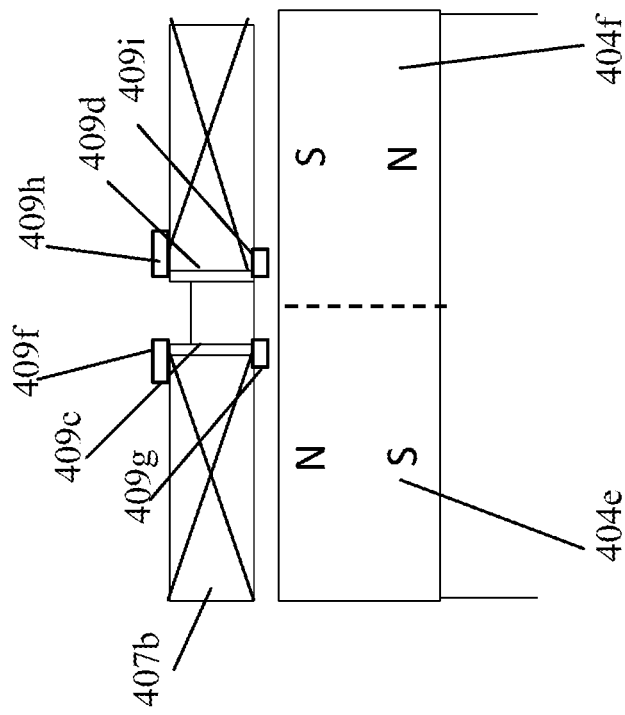

Referring now to FIGS. 10A and 10B, a description will be given of a third embodiment according to the present invention. FIGS. 10A and 10B are configuration diagrams of the driving amount amplifier (first magnetic body 409c and second magnetic body 409d) according to this embodiment. FIG. 10A illustrates a connector 409e as the driving amount amplifier that connects the first magnetic body 409c and the second magnetic body 409d. The configuration of FIG. 10A also provide an effect similar to that in the second embodiment.

FIG. 10B illustrates, as driving amount amplifier, planar portions (extending portions) 409f and 409g at both ends of the first magnetic body 409c, and planar portions (extending portions) 409h and 409i at both ends of the second magnetic body 409d. Each of the above embodiments disposes the magnetic force generator (ferromagnetic body) so as to be housed in the inner diameter of the drive coil, but as illustrated in FIG. 10B, part of the ferromagnetic body that protrudes from the inner diameter of the drive coil may be disposed (to the outside of the opening of the drive coil). With the configuration of FIG. 10B, the driving amount amplifier can be stably fixed to the drive coil 407b. According to the driving amount amplifier illustrated in FIG. 10B, since the facing area with the drive magnet 404*b* (first magnet part 404*e*, second magnet part 404*f*) is increased, a stronger force can be generated. The structure in FIG. 10B can provide another drive magnet above the drive coil 407*b* or a counter magnet on the opposite side of the drive magnet 404*b* across the drive coil 407*b*.

Each embodiment uses a two-pole magnetized magnet as the drive magnet, but may use two magnets side by side. Each embodiment uses the driver provided with the drive magnet, the drive coil, and the drive yoke attracted to the drive magnet, but is not limited to this as long as the drive force can be generated. For example, a drive yoke for attracting the drive magnet may not be provided. For example, a driver may be used which include an opposing yoke on the opposite side of the drive magnet with respect to the drive coil. In particular, a configuration is effective in which the drive coil is disposed in the movable unit, the opposed yoke is fixed onto the base side, and the drive coil and the opposing yoke do not integrally move, because the magnetic force can be obtained without increasing the weight of the movable unit.

Each embodiment illustrates the example which biases the shift barrel toward the base member using the three springs, but may bias it using two springs and the number of springs is not limited. This embodiment has described an example of two sets of drive magnets and drive coils, but may use three or more sets of drive magnets and drive coils. In this case, a magnetic force generator can be provided to each of the three drive coils.

Thus, in each embodiment, the optical image stabilization apparatus (image stabilization units 040 and 042) includes the image stabilization element (the sixth lens unit 016 and the image sensor 101) and the base member (base members 401 and 421). The optical image stabilization apparatus includes the shift member (shift barrels 026 and 226), the elastic member (springs 403*a* to 403*c* and 423*a* to 423*c*), and the driver. The shift member holds the image stabilization element and is movable in a direction including a component in a direction perpendicular to the optical axis relative to the base member (or a direction different from the optical axis direction). The elastic member supports the image stabilization element and the shift member. The driver drives the shift member in a direction intersecting the optical axis. The driver includes the first magnet part 404*e* and the second magnet part 404*f* provided to one of the base member and the shift member, and the coil provided to the other of the base member and the shift member (drive coils 407*b* and 427*b*). The driver includes, in the opening (407*g*, 427*g*) of the coil, the first magnetized portion (409*c*, 429*c*) provided on the first magnet part side of the center axis (normal line) of the opening and the second magnetized portion (409*d*, 429*d*) provided on the second magnet part side with respect to the center axis.

Each of the first magnetic part and the second magnetic part may be ferromagnetic. The optical image stabilization apparatus may include the connector 429*g* that connects the first magnetized portion and the second magnetized portion. The shortest distance in the optical axis direction between the connector and the first or second magnet part may be longer than the shortest distance in the optical axis direction between the first or second magnetized portion and the first or second magnet part.

The optical image stabilization may include a first extending portion (planar portions 409*f*, 409*g*, and 429*e*) extending from the first magnetized portion to the first magnet part side, and a second extending portion (plane portions 409*h*, 409*i*, and 429*f*) extending from the second magnetized portion to the second magnet part side. The first extending portion extends from the first magnetized portion to the first magnet part side (409*f*, 409*g*) outside the opening of the coil, and the second extending portion extends from the second magnetized portion to the second magnet part side (409*h*, 409*i*) outside the opening of the coil. The first extending portion and the second extending portion may be disposed on both sides of the coil so as to sandwich the coil in the optical axis direction. The optical image stabilization apparatus may have at least two drivers for driving the shift member in a first direction (such as the Y-axis direction) and a second direction (such as the Z-axis direction) that are different from each other.

The lens apparatus (lens barrel 000) may include the optical image stabilization apparatus and a barrel member (3B barrel 024) that holds the optical image stabilization apparatus, and the image stabilization element is a lens (sixth lens unit 016). The imaging apparatus may include the optical image stabilization apparatus and a camera body 100 that holds the optical image stabilization apparatus, and the image stabilization element is the image sensor 101.

Each embodiment can provide an optical image stabilization apparatus, a lens apparatus, and an imaging apparatus, each of which is smaller than ever.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-002256, filed on Jan. 10, 2019, which is hereby incorporated by reference herein in its entirety.

What is claimed is:

1. An optical image stabilization apparatus comprising:
   an image stabilization element;
   a base member;
   a shift member configured to hold the image stabilization element and movable in a direction including a component orthogonal to an optical axis relative to the base member;
   an elastic member configured to support the image stabilization element and the shift member; and
   a driver configured to move the shift member,
   wherein the driver includes:
   a first magnet part and a second magnet part provided on one of the base member and the shift member;
   a coil provided on the other of the base member and the shift member;
   a first magnetized portion provided on a side of the first magnet part with respect to a center axis of an opening in the coil; and
   a second magnetized portion spaced apart from the first magnetized portion and provided on a side of the second magnet part with respect to the center axis of the opening in the coil.

2. The optical image stabilization apparatus according to claim 1, wherein each of the first magnetized portion and the second magnetized portion includes a ferromagnetic body.

3. The optical image stabilization apparatus according to claim 1, further comprising a connector configured to connect the first magnetized portion and the second magnetized portion to each other.

4. The optical image stabilization apparatus according to claim 3,
   wherein a shortest distance in an optical axis direction between the connector and the first or second magnetized portion is longer than a shortest distance in the optical axis direction between the first or second magnetized portion and the first or second magnet part.

5. The optical image stabilization apparatus according to claim 1, further comprising:
a first extending portion extending from the first magnetized portion to the side of the first magnet part; and
a second extending portion extending from the second magnetized portion to the side of the second magnet part.

6. The optical image stabilization apparatus according to claim 5, wherein the first extending portion extends from the first magnetized portion to the side of the first magnet part outside the opening of the coil, and
wherein the second extending portion extends from the second magnetized portion to the side of the second magnet part outside the opening of the coil.

7. The optical image stabilization apparatus according to claim 6, wherein the first extending portion and the second extending portion are disposed on both sides of the coil so as to sandwich the coil in the optical axis direction.

8. The optical image stabilization apparatus according to claim 1, further comprising at least two drivers configured to drive the shift member in a first direction and a second direction that are different from each other.

9. The optical image stabilization apparatus according to claim 1, wherein the image stabilization element is a lens.

10. The optical image stabilization apparatus according to claim 1, wherein the image stabilization element is an image sensor.

\* \* \* \* \*